US008837957B2

(12) United States Patent
Zhang et al.

(10) Patent No.: US 8,837,957 B2
(45) Date of Patent: Sep. 16, 2014

(54) METHOD AND APPARATUS OF USING DIGITAL EQUALIZER FOR CASCADED WAVELENGTH SELECTIVE SWITCH COMPENSATION

(75) Inventors: Zhuhong Zhang, Ottawa (CA); Yanming Li, Shenzhen (CN); Chuandong Li, Ottawa (CA); Fei Zhu, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 112 days.

(21) Appl. No.: 13/348,952

(22) Filed: Jan. 12, 2012

(65) Prior Publication Data

US 2013/0183034 A1    Jul. 18, 2013

(51) Int. Cl.
 *H04B 10/06* (2006.01)
(52) U.S. Cl.
 USPC ............ 398/208; 398/202; 398/204; 398/209
(58) Field of Classification Search
 None
 See application file for complete search history.

(56) References Cited

U.S. PATENT DOCUMENTS

| | | | |
|---|---|---|---|
| 4,922,506 A * | 5/1990 | McCallister et al. | 375/142 |
| 2010/0128774 A1 | 5/2010 | He | |
| 2010/0142952 A1 | 6/2010 | Qian et al. | |
| 2010/0329695 A1 | 12/2010 | Sridhar | |
| 2011/0150478 A1* | 6/2011 | Winzer | 398/65 |
| 2011/0206385 A1* | 8/2011 | Chen et al. | 398/208 |
| 2011/0243573 A1* | 10/2011 | Roberts et al. | 398/152 |
| 2011/0255861 A1* | 10/2011 | Bruno | 398/16 |

OTHER PUBLICATIONS

Li, et al., "Method and Apparatus for Carrier Phase Estimation and Correction in Coherent Optical System," U.S. Appl. No. 13/179,300, filed May 10, 2011, 48 pages.
Foreign Communication From A Counterpart Application, PCT Application No. PCT/CN2013/070423, International Search Report dated Apr. 18, 2013, 6 pages.
Foreign Communication From A Counterpart Application, PCT Application No. PCT/CN2013/070423, Written Opinion dated Apr. 18, 2013, 4 pages.

* cited by examiner

*Primary Examiner* — Ken Vanderpuye
*Assistant Examiner* — Merlin Brito Peguero
(74) *Attorney, Agent, or Firm* — Conley Rose, P.C.; Grant Rodolph; William H. Dietrich (57) ABSTRACT

An apparatus comprising a frequency-domain equalizer that has been iteratively generated to compensate for filtering effects of a wavelength selective switch, wherein the FDEQ is configured to process in a frequency domain digital samples of a polarization multiplexed phase-shift-keying signal that has been transported over an optical channel.

19 Claims, 10 Drawing Sheets

METHOD AND APPARATUS OF USING DIGITAL EQUALIZER FOR CASCADED WAVELENGTH SELECTIVE SWITCH COMPENSATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Rapid increases in the demand for bandwidth in optical links, such as links found in long-haul optical networks, are necessitating rapid increases in the capacity of optical links. As the capacity of optical channels in some networks approaches 100 gigabits-per-second (Gbps), the bandwidth of wavelength-selective switches (WSSs) may be such that WSSs cascaded along an optical link degrades high-speed optical signals and consequently limits system performance. Thus, there may be a need to compensate for the presence of WSSs in the demodulation of high-speed optical signals in optical receivers.

SUMMARY

In one aspect, the invention includes an apparatus comprising a frequency-domain equalizer (FDEQ) that has been iteratively generated to compensate for filtering effects of a WSS, wherein the FDEQ is configured to process in a frequency domain digital samples of a polarization multiplexed phase-shift-keying signal that has been transported over an optical channel.

In another aspect, the invention includes a method comprising receiving a plurality of digital samples of a polarization multiplexed phase-shift-keying signal that has been transported over an optical channel; and filtering some of the digital samples using a FDEQ that has been iteratively generated to compensate for filtering effects of a WSS.

In yet another aspect, the invention includes an apparatus comprising a plurality of FDEQs configured to receive digital samples of a polarization multiplexed (PM) phase-shift-keying signal that has been transported over an optical channel, a time-domain equalizer (TDE) coupled to the FDEQs and configured to filter outputs from the FDEQs, a carrier phase recovery and correction unit coupled to the TDE and configured to correct a phase of outputs from the TDE, a decision unit coupled to the carrier phase recovery and correction unit and configured to generate symbol decisions for the PM phase-shift-keying signal, and a processor configured to receive an error signal generated as a difference between an input to the decision unit and an output from the decision unit and to iteratively generate a transfer function of the FDEQs based on the error signal to compensate for filtering effects of a WSS.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods for compensating for signal amplitude and phase distortion in optically bandlimited channels, which may be a result of one or more cascaded WSSs along optical communication links. A WSS may be an integrated device for wavelength multiplexing and demultiplexing of wavelength domain multiplexing signals and configured to switch signals on a per-wavelength basis. The optical communication links of interest may employ coherent receivers and transport PM quadrature phase shift keying (QPSK) signals. A polarization multiplexed signal may refer to the combination of two optical signals of the same frequency, but with orthogonal polarizations. PM QPSK signals have been considered in Institute of Electrical and Electronics Engineers (IEEE) and International Telecommunication Union (ITU) standards bodies to accommodate 100 Gbps optical channels.

Figure 1:
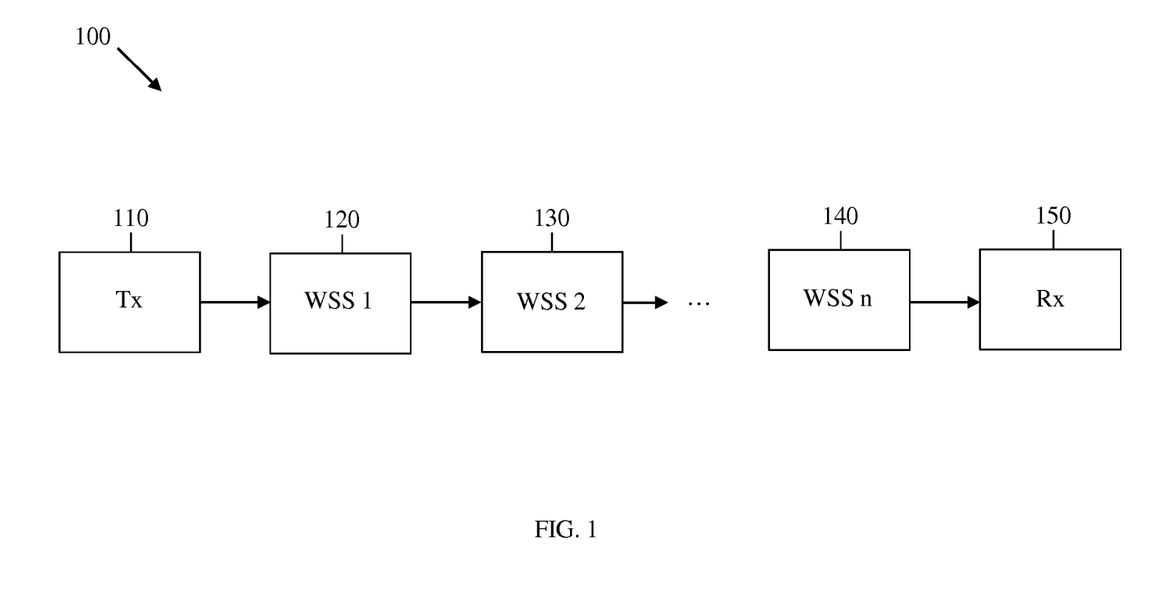
FIG. 1 is a schematic diagram of an embodiment of an optical communication system with cascaded WSSs.

A schematic diagram of an embodiment of an optical communication system 100 with cascaded WSSs is illustrated in FIG. 1. The optical communication system may comprise an optical transmitter 110, n WSSs 120-140, where n is a positive integer, and an optical receiver 150 arranged as shown in FIG. 1. The transmitter 110 may be an optical transmitter, and may, for example, be configured to transmit a PM QPSK signal at 100 Gbps. Each WSS 120-140 may be a wavelength-selective switch that may be configured as a reconfigurable optical add-drop multiplexer (ROADM). In one embodiment, a WSS may be implemented as array waveguide gratings. The receiver 150 may be an optical receiver, and may, for example, be configured to demodulate a PM QPSK signal.

Figure 2:
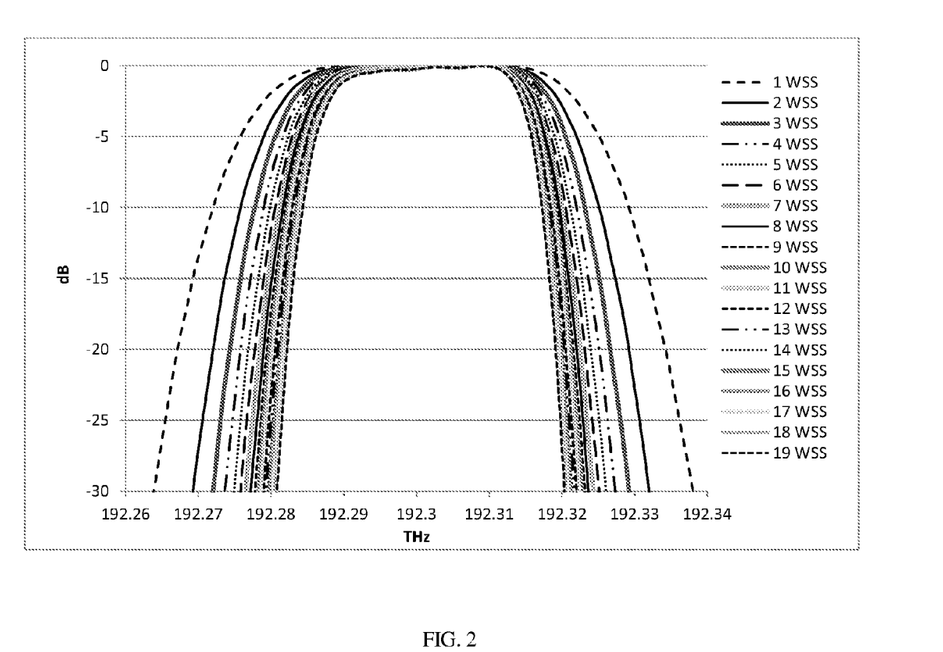
FIG. 2 shows amplitude responses of different numbers of cascaded WSSs.
Figure 3:
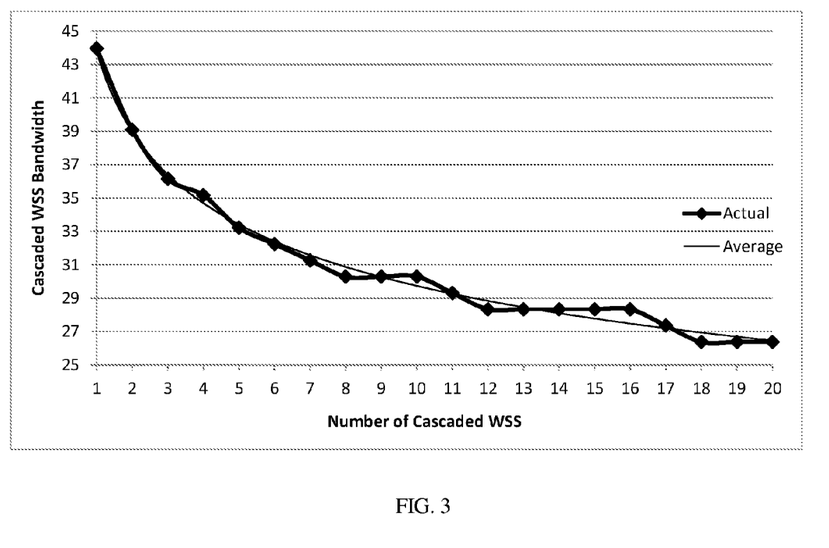
FIG. 3 shows a 3 decibel (dB) bandwidth of different numbers of WSSs.
Figure 4:
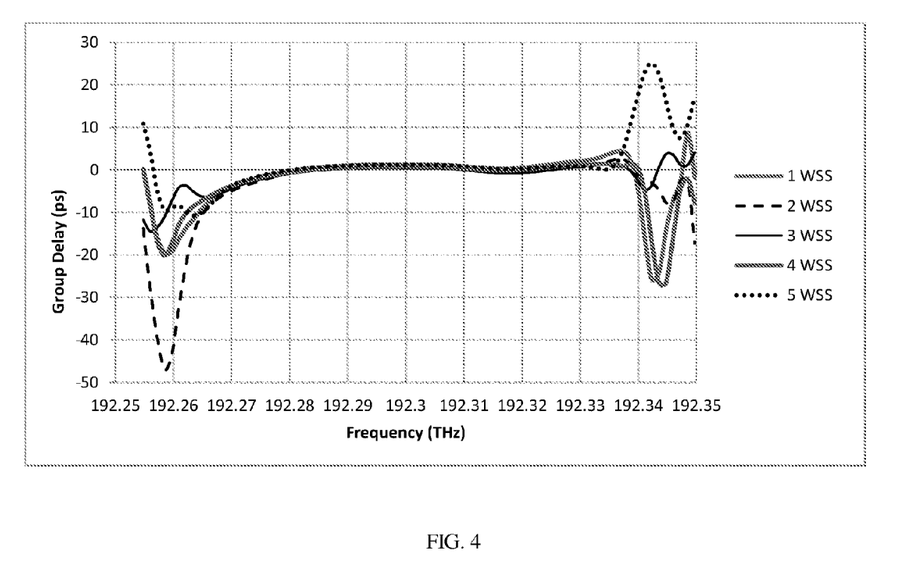
FIG. 4 shows phase responses of different numbers of cascaded WSSs.

FIG. 2 shows amplitude responses of different numbers of cascaded WSSs, FIG. 3 shows a 3 dB bandwidth of different numbers of WSSs, and FIG. 4 shows phase responses of different numbers of cascaded WSSs. Cascaded WSSs may introduce undesired changes in an optical signal, such amplitude and/or phase distortion. For example, according to FIG. 2, a 3 dB bandwidth of one WSS may be approximately 44 gigahertz (GHz). However, if twelve WSSs are cascaded, the 3 dB bandwidth of the cascaded WSSs may drop to approximately 29 GHz, thereby causing distortion of a 100 Gbps PM QPSK signal, which has a bandwidth of approximately 32 GHz.

Figure 5:
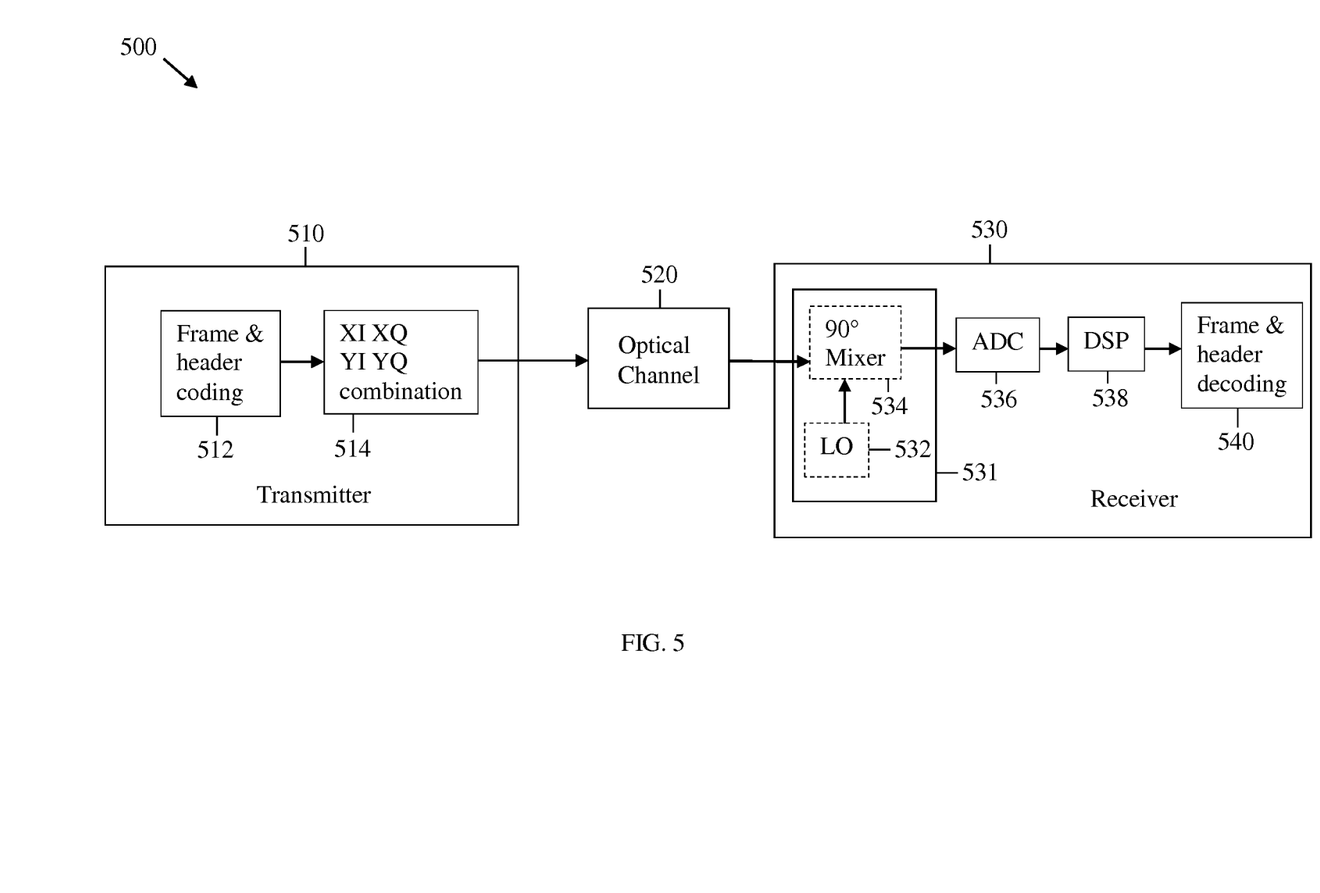
FIG. 5 is a schematic diagram of an embodiment of an optical communication system with dual-polarization multiplexing and coherent reception.

A schematic diagram of an embodiment of an optical communication system 500 with PM multiplexing and coherent reception is shown in FIG. 5. The optical communication system may comprise an optical transmitter 510, an optical channel 520, and an optical receiver 530 as illustrated in FIG. 5. The optical communication system 500 may employ PM QPSK signaling.

The optical transmitter 510 may comprise a frame and header coding unit 512 and a signal combination block or multiplexer 514 coupled to the frame and header coding unit 512. The frame and header coding unit 512 may be configured to encode and/or encapsulate input data into four parallel data streams, corresponding to four branches of a PM QPSK signal. The output of the frame and header coding unit 512 may be converted into an optical signal in the multiplexer 514, in which four data streams may be formatted as two orthogonal liner polarization signals (e.g., X and Y polarizations), wherein each polarization component may be comprised of two orthogonal phase components (in-phase I and quadrature-phase Q). These signals may be converted to an optical signal via an electrical-to-optical converter.

The optical signal from multiplexer 514 may be received by the optical receiver 530 after propagating through an optical channel 520. The optical channel 520 may be configured to transport a PM optical signal from the transmitter 510 to the receiver 530, and as such may comprise one or more optical fibers, optical filters, amplifiers, and WSSs. Such components of the optical channel 520 may introduce undesired signal changes, such as chromatic dispersion, nonlinear phase noise, polarization mode dispersion, polarization dependent loss and/or gain, polarization rotation, optical white Gaussian noise, or combinations thereof. For example, as discussed above, undesired signal changes may include amplitude and/or phase distortion due to cascaded WSSs.

The receiver 530 may comprise an integrated coherent receiver 531, an analog-to-digital converter (ADC) 536 coupled to the integrated coherent receiver 531, a digital signal processor (DSP) unit 538 coupled to the ADC 536, and a frame and header decoding unit 540 coupled to the DSP unit 538. The integrated coherent receiver 531 may receive an optical signal input and generate one or more electrical signal outputs. The integrated coherent receiver 531 may comprise a laser serving as a local oscillator (LO) 532 and a 90° mixer 534 coupled to the LO 532. The 90° mixer 534 may comprise an about 90° optical cross network mixer and a photodetector, e.g. a p-type/intrinsic/n-type (PIN) diode and may be configured to mix the received orthogonal components of the optical signal from the transmitter 510 and split the signal into a plurality of signals, where each signal may be a combination of the orthogonal signal components. The 90° mixer 534 may mix the received optical signal components with an optical signal from the LO 532 that may have a close or about the same carrier frequency of the transmitted optical signal. The output from the mixer 534 may split a received signal into four signals, with each signal being a mixture of transmitted data signals. The output mixed signals from the 90° mixer 534 may then be converted by the ADC 536 (e.g., from analog to digital) and forwarded to the DSP unit 538, which may be configured to process the signals and recover the data in the transmitted signal, as discussed further in detail below. A DSP unit may also be referred to simply as a DSP, and the DSP unit 538 may comprise an application specific integrated circuit (ASIC) DSP.

Figure 6:
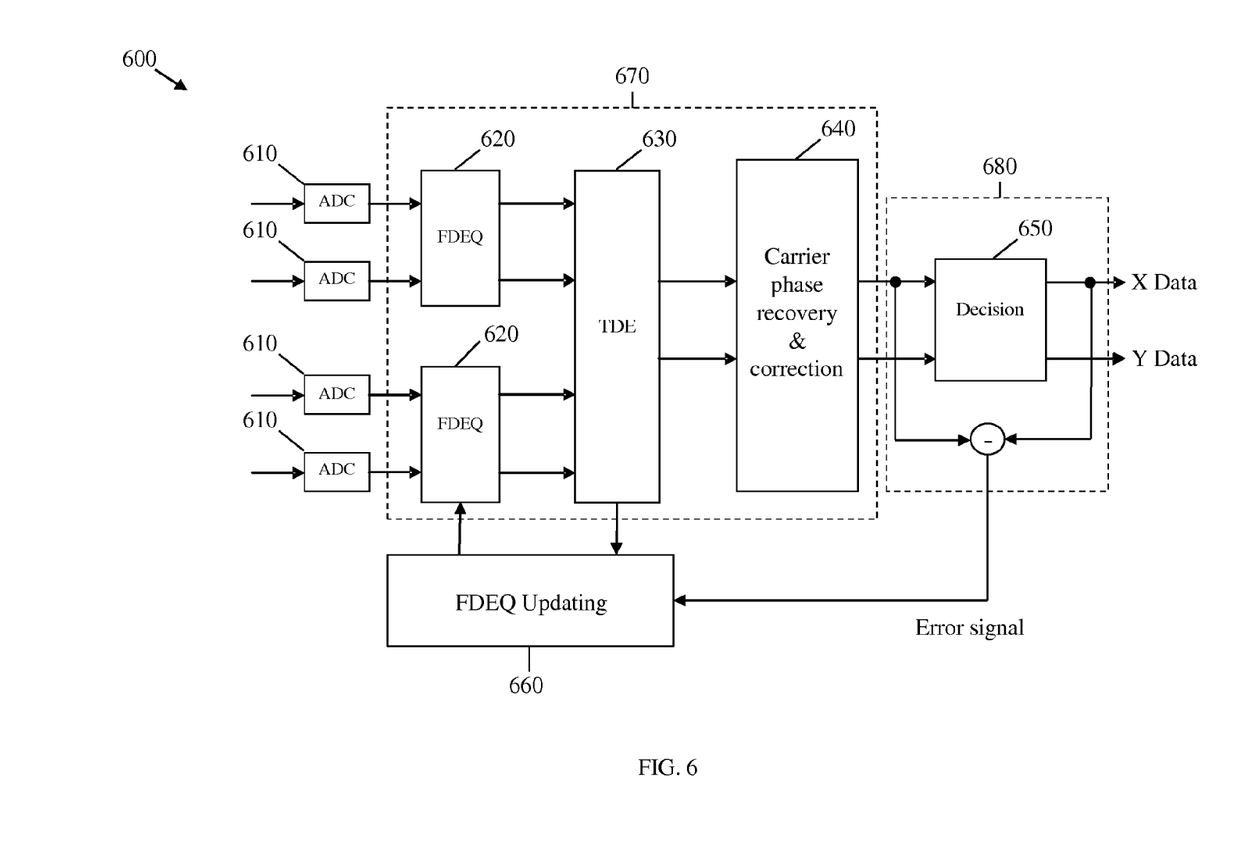
FIG. 6 is a schematic diagram of an embodiment of a receiver digital signal processor (DSP) unit for demodulating polarization multiplexed quadrature phase shift keying (PM QPSK) signals.

FIG. 6 is a schematic diagram of an embodiment of a receiver DSP unit 600 for demodulating PM QPSK signals. For example, the DSP unit 600 may correspond to DSP unit 538 in FIG. 5. The receiver DSP unit 600 may be configured to receive four signals, two signals per each of the orthogonal polarization components in a PM QPSK signal. Two signals, i.e., in-phase and quadrature signals, may be required per polarization component because each component may utilize QPSK signaling. There may be four ADCs 610, one for each of the four input signals. The ADCs 610 may convert analog input signals into digital output signals. There may be two frequency-domain equalizers (FDEQs) 620, wherein each FDEQ may use a same transfer function $H_{FDE}$ to compensate for chromatic dispersion, a modem response, and amplitude distortion due to the presence of one or more WSSs between a transmitter and receiver. The FDEQs 620 may perform filtering in the frequency domain.

A time-domain equalizer (TDE) 630 may compensate for polarization mode dispersion and phase distortion due to the presence of one or more WSSs. The TDE 630 may be adaptive and may have tap weights that may be adapted in an on-going basis. The TDE 630 may be a multiple-input multiple-output finite impulse response adaptive filter that performs filtering in the time domain. Further, the TDE 630 may receive four real-valued signals as inputs and generate two complex-valued signals as outputs. The TDE 630 is described further below.

A carrier phase recovery and correction unit 640 may be configured to recover a carrier phase. The carrier phase recovery and correction unit 640 may correct the timing of the received component signals, which may be offset due to fiber dispersion. In some embodiments, the carrier phase recovery and correction unit 640 may implement phase correction using one or more of the techniques described in U.S. patent application Ser. No. 13/179,300, filed Jul. 8, 2011, entitled "Method and Apparatus for Carrier Phase Estimation and Correction in a Coherent Optical System," which is incorporated by reference as if reproduced in its entirety. A decision unit 650 may perform hard decisions on outputs from unit 640 to generate data for each polarization (e.g., an X polarization and a Y polarization). An error signal may be generated as shown in FIG. 6 by, for example, subtracting soft decisions for one polarization, e.g., obtained at an output from phase recovery and correction unit 640, from hard decisions for the polarization, e.g., obtained at an output from decision unit 650. Either the X polarization or the Y polarization may be used to generate the error signal, and the error signal may be fed back to FDEQ updating unit 660.

The transfer function for the FDEQs 620 is computed in FDEQ updating unit 660 as follows. First, a pre-defined transfer function H is computed as $H = H_{RF}^{-1} \times H_{CD}^{-1}$, where $H_{RF}$ represents a modem response and $H_{CD}$ represents chromatic dispersion, where all transfer functions may be understood to be expressed in the frequency domain. Transfer function H may compensate for chromatic dispersion in an optical channel and a modem response.

An FDEQ updating unit 660 may achieve compensation for a number of WSSs in the optical link between transmitter and receiver by performing the following steps. First, an initial FDEQ transfer function may be computed as $H_{FDE}(1) = H \times H_{WSS}^{-1}$, where $H_{WSS}$ may be an amplitude response of a typical WSS as expressed in the frequency domain and may be provided by a component vendor. Next filter taps of the TDE 630 may be adaptively computed using standard algorithms, such as a constant modulus algorithm (CMA) or a root mean squared (RMS) algorithm. A set of received signals at inputs to ADCs 610 may be processed by the ADCs 610 to generate a group of digital signals. The group of digital signals may include, for example, symbols known at the receiver and that may have been transmitted as part of a header. The digital signals may be processed using the computed FDEQ and TDE filters to generate an error signal input to FDEQ updating unit 660. The FDEQ updating unit may compute a power of the error signal as $P_1$. Also, the value of integer i may be set to one.

The process may be repeated using the following steps in an iterative process.
1. Increment i as i=i+1, and compute a transfer function of FDEQs 620 may be computed as $H_{FDE}(i) = H_{FDE}(i-1) \times H_{WSS}^{-1}$.
2. The tap weights for TDE 630 may be computed as described earlier using the new value for transfer function of FDEQs 620. A new error signal may be generated by processing (using the computed FDEQ and TDE filters) the same group of digital signals as used to compute $P_1$, or the error signal may be generated by processing a different group of digital signals. A power of the resulting error signal may be computed as $P_i$.
3. Compare $P_i$ to $P_{i-1}$. If $P_i < P_{i-1}$, repeat steps 1 through 3. Otherwise, stop the iterative process and set the transfer functions of the FDEQs 620 as $H_{FDE} = H_{FDE}(i-1)$.

The transfer function $H_{FDE} = H_{FDE}(i-1)$ yielded by the steps for the FDEQs 620 may compensate for amplitude distortion as a result of one or more WSSs on the optical communication link between transmitter and receiver. The argument i−1 of the transfer function may be interpreted as an estimate of the number of WSSs in the optical channel.

Tap weights $w_{xx}$, $w_{xy}$, $w_{yx}$, and $w_{yy}$ for TDE 630 may be computed as described earlier assuming a transfer function for each of the FDEQs may be $H_{FDE}$ as obtained by the iterative process described above. Next tap weights $w_{xx}$, $w_{xy}$, $w_{yx}$, and $w_{yy}$ may be loaded into FDEQ updating unit 660. Using these tap weights, there may be two possible options for computing a phase response to be used to update FDEQ transfer function $H_{FDE}$. In a first option, $H_{FDE}$ may be updated as $H_{FDE} = H_{FDE} \times D(f)$, where $D(f)$ may be computed by solving the equation $$FFT\begin{Bmatrix} w_{xx} & w_{yx} \\ w_{xy} & w_{yy} \end{Bmatrix} = D(f) \prod_{i=N,-1}^{1} U_i^{-1} V_i^{-1},$$

where "FFT" denotes fast Fourier transform, $U_i$ are known polarization mode dispersion (PMD) matrices, $V_i$ are known polarization dependent loss (PDL) matrices, and N represents a number of PMD and PDL components in the optical link. However, calculating D(f) may be impractical in certain scenarios, as $U_i$ and $V_i$ are elements that may change quickly compared with the phase of cascaded WSSs. In a second option, $H_{WSS}^\Phi$ may be computed as $H_{WSS}^{100} = \exp(j \cdot \arg(\sqrt{\det(W(f))}))$, where $$W(f) = FFT\begin{Bmatrix} w_{xx} & w_{yx} \\ w_{xy} & w_{yy} \end{Bmatrix}.$$

The FDEQ transfer function $H_{FDE}$ may be updated as $H_{FDE} = H_{FDE} \times H_{WSS}^\Phi$.

Once the filter for FDEQs 620 is computed by FDEQ updating unit 660, FDEQ updating unit 660 can shut off for some time and the error signal may also stop being computed for some time. Further, the ADCs 610, FDEQs 620, TDE 630, carrier phase recovery and correction unit 640, and decision unit 650 may operate on received signals to generate data (e.g., X Data and Y Data in FIG. 6) in an on-going basis.

The DSP unit 600 in FIG. 6 may have an overall architecture comprising a digital linear equalizer 670 which provides an approximation of an inverse response of one or more cascaded WSSs, a signal quality monitor 680, and an FDEQ updating unit 660 as described earlier. The digital linear equalizer response may be based on a quality of a recovered signal generated by signal quality monitor 680.

Figure 7:
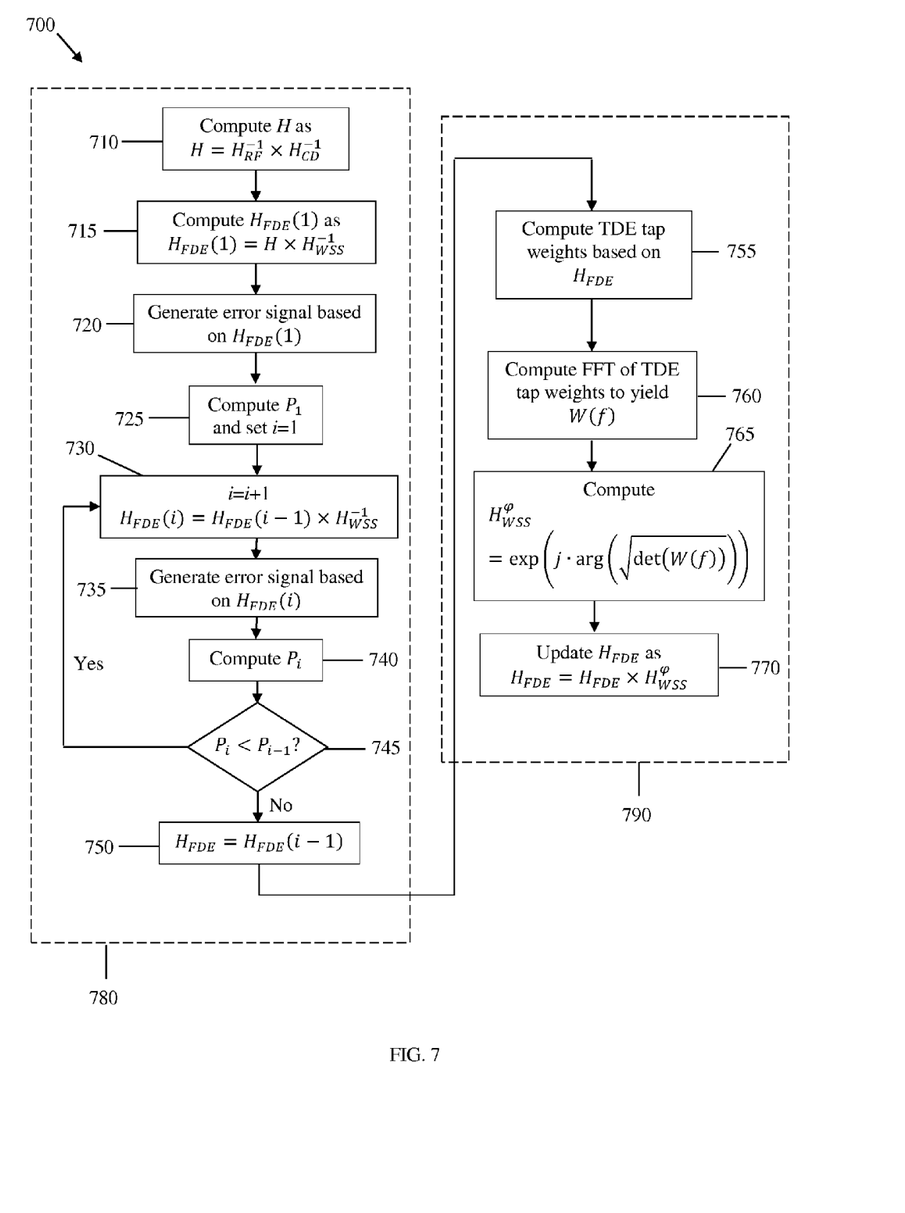
FIG. 7 is a flowchart of an embodiment of a method for computing filters for demodulating PM QPSK signals.

FIG. 7 is a flowchart of an embodiment of a method 700 for computing equalizer filters for coherent demodulation of PM QPSK signals. The method 700 may yield filters that compensate for a number of WSSs in an optical link. In step 710, a pre-defined transfer function H is computed as $H = H_{RF}^{-1} \times H_{CD}^{-1}$, where $H_{RF}$ represents a modem response and $H_{CD}$ represents chromatic dispersion. Transfer function H may compensate for chromatic dispersion in an optical channel and a modem response. In step 715, an FDEQ transfer function may be computed as $H_{FDE}(1) = H \times H_{WSS}^{-1}$, where $H_{WSS}$ may be an amplitude response of a typical WSS and may be provided by a component vendor. Next in step 720, an error signal may be generated based on $H_{FDE}(1)$. For example, an error signal may be generated by processing a group of sampled received PM QPSK signals that has been split into four components, corresponding to in-phase and quadrature of each polarization signal, using two parallel filters $H_{FDE}(1)$ cascaded with a TDE filter. The TDE filter tap weights may be computed using, for example, a CMA or RMS algorithm. The phase of the filtered received signal may be corrected using a carrier phase recovery and correction unit, and the error signal may be generated as a difference between hard decisions and a signal on which carrier phase recover and correction has been performed. In step 725, a power of the error signal may be computed as $P_1$, and i may be set to equal to one.

An iterative process may be performed using steps 730-745 in which FDEQs may be updated to compensate for cascaded WSSs. In step 730, the value of i may be incremented as i+1 and the transfer function of FDEQs may be updated as $H_{FDE}(i) = H_{FDE}(i-1) \times H_{WSS}^{-1}$. In step 735, TDE tap weights may be computed based on $H_{FDE}(i)$ in a similar manner as in step 720, except that $H_{FDE}(i)$ may be used for filtering instead of $H_{FDE}(1)$. In step 740, an error signal power $P_i$ may be computed using an error signal as a difference between hard decisions and a signal on which carrier phase recovery and correction has been performed.

In step 745, it is determined whether $P_i$ is less than $P_{i-1}$. If $P_i < P_{i-1}$ the process returns to step 730, whereas if $P_i$ is not less than $P_{i-1}$, the process continues to step 750 in which $H_{FDE}$ is set equal to $H_{FDE}(i-1)$. In step 755, TDE tap weights are computed in a similar manner to step 735, i.e., TDE tap weights are computed under an assumption that a received PM QPSK signal that has been split into four components, corresponding to in-phase and quadrature components of each polarization signal, may be filtered using two parallel filters with computed transfer function $H_{FDE}$ cascaded with the TDE. In step 760, the FFT of TDE tap weights $w_{xx}$, $w_{xy}$, $w_{yx}$, and $w_{yy}$ is computed as $$W(f) = FFT\begin{Bmatrix} w_{xx} & w_{yx} \\ w_{xy} & w_{yy} \end{Bmatrix}.$$

In step 765, a phase compensation (term $H_{WSS}{}^\phi$ may be computed as $H_{WSS}{}^\phi = \exp(j \cdot \arg(\sqrt{\det(W(f))}))$. Finally, in step 770 an updated FDEQ transfer function may be computed as $H_{FDE}H = H_{FDE} \times H_{WSS}{}^\phi$.

Steps 710-750 in the portion of the flowchart labeled 780 represent compensation for amplitude distortion due to cascaded WSSs, and steps 755-770 in the portion of the flowchart labeled 790 represent compensation for phase distortion due to cascaded WSSs. Sufficient performance may be obtained in systems by performing amplitude compensation steps 710-750 only. However, improved performance may be achieved by also performing phase compensation steps 755-770.

Figure 8:
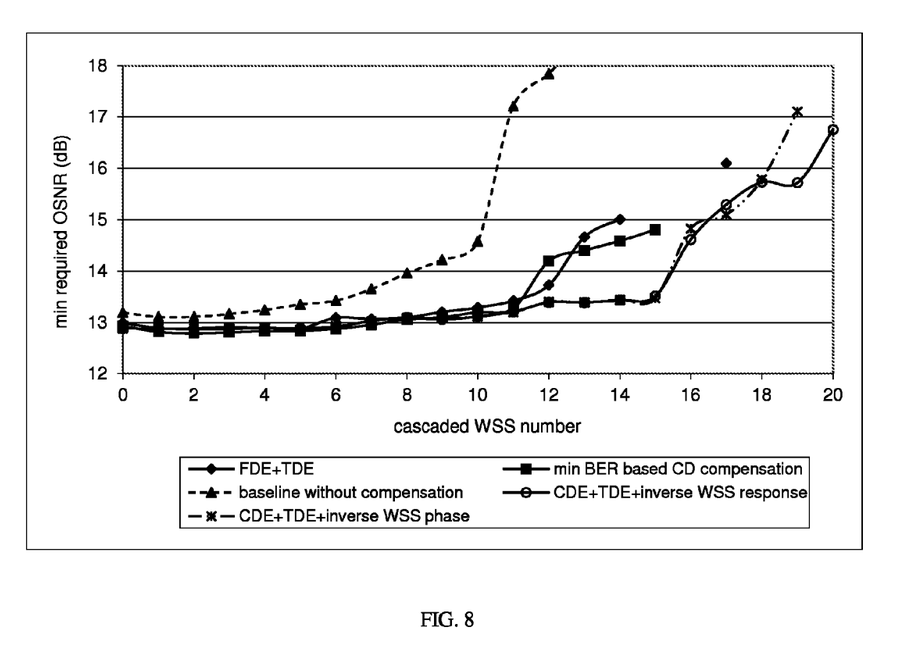
FIG. 8 shows the minimum required optical signal-to-noise ratio (OSNR) versus the number of cascaded WSSs for various receivers and 100 Gigabits-per-second (Gbps) PM QPSK.

FIG. 8 shows the minimum required optical signal-to-noise ratio (OSNR) versus the number of cascaded WSSs for various receivers and 100 Gbps PM QPSK. Communication may be generally reliable if the OSNR is greater than the minimum required OSNR. The results in FIG. 8 were obtained via simulation. As seen in FIG. 8, for a 1 dB penalty in OSNR, a 100 Gbps PM QPSK signal may traverse only 8 or 9 WSSs using a baseline receiver without compensating for cascaded WSSs (scheme marked "baseline without compensation"). However, if method 700 is employed to compute FDEQ and TDE filters for demodulating 100 Gbps PM QPSK signals and these signals are demodulated using these filters, a 100 Gbps PM QPSK signal may traverse up to 12 WSSs while sustaining only a 1 dB penalty in OSNR (scheme marked "CDE+TDE"). Further, if phase is instead compensated by computing D(f) and updating the FDEQs using D(f), a 100 Gbps PM QPSK signal may traverse up to 15 WSSs (scheme marked "CDE+TDE+inverse WSS phase").

Figure 9:
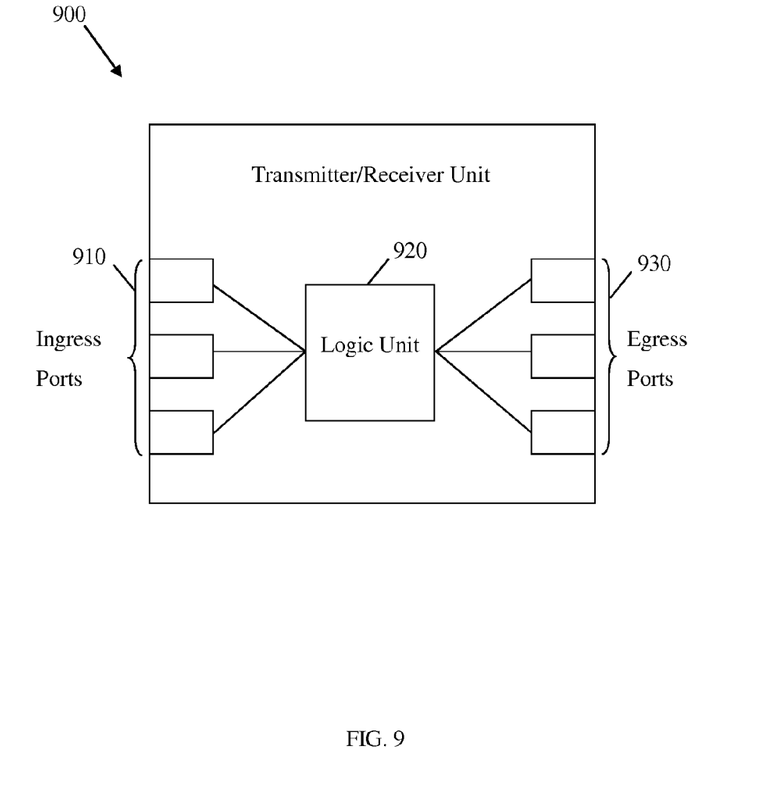
FIG. 9 is a schematic diagram of an embodiment of a transmitter/receiver unit.

FIG. 9 illustrates an embodiment of a transmitter/receiver unit 900, which may be any device that transports packets through a network. For instance, the transmitter/receiver unit 900 may be located in the optical communication system 500. The transmitter/receiver unit 900 also may be configured to implement or support the method 700 for computing filters for demodulating PM QPSK described above. The transmitter/receiver unit 900 may comprise one or more ingress ports or units 910 for receiving packets, objects, or type-length-values (TLVs) from other network components, logic circuitry 920 to determine which network components to send the packets to, and one or more egress ports or units 930 for transmitting frames to the other network components. The logic circuitry 920 may also comprise all or part of DSP unit 600 described above and may be configured to implement at least some of the steps of the method 700 for computing filters for demodulating PM QPSK signals described above.

Figure 10:
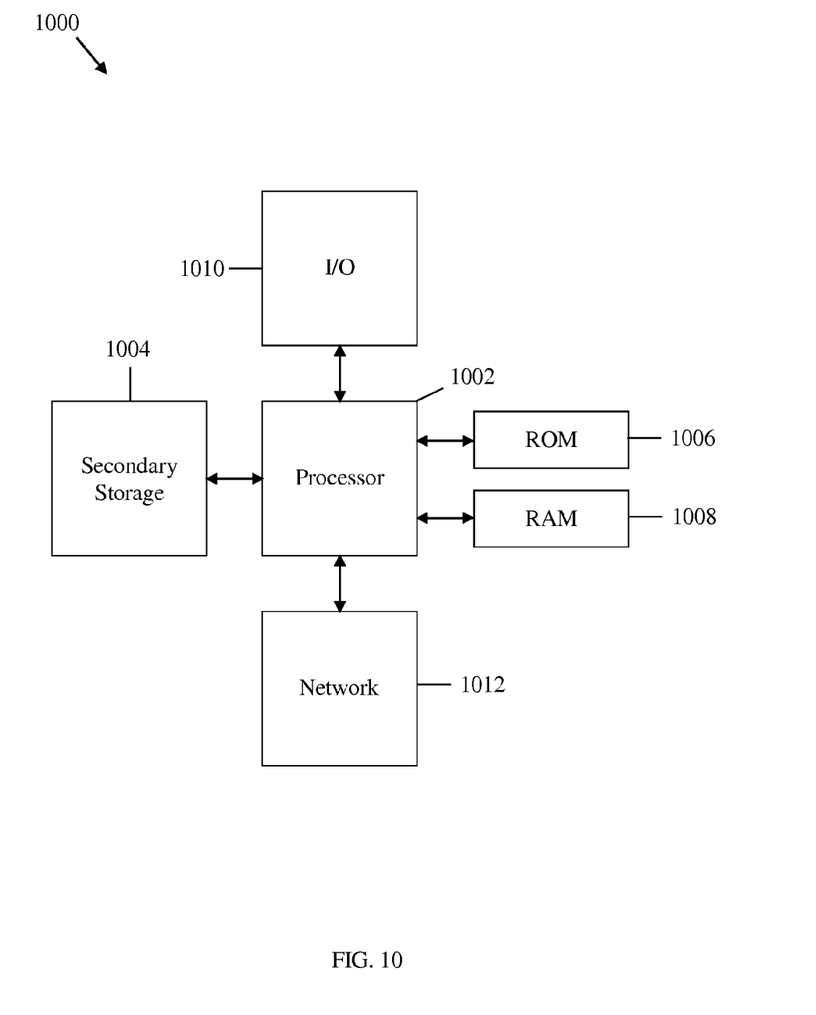
FIG. 10 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 10 illustrates a typical, general-purpose network component 1000 suitable for implementing one or more embodiments of the components disclosed herein. The network component 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips, or may be part of one or more ASICs. The processor 1002 may comprise all or part of DSP unit 600 described above and may be configured to implement at least some of the steps of the method 700.

The secondary storage 1004 is typically comprised of one or more disk drives or tape drives and is used for non-volatile storage of data and as an over-flow data storage device if RAM 1008 is not large enough to hold all working data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R = R_l + k*(R_u - R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising: a processor configured to compute a transfer function based at least in part on an amplitude response of a wavelength selective switch (WSS); and a frequency-domain equalizer (FDEQ) configured to filter, using the transfer function and in a frequency domain, a plurality of digital samples of a polarization multiplexed phase-shift-keying signal that has been transported over an optical channel, wherein filtering the plurality of digital samples compensates for filtering effects of at least one WSS located in the optical channel, wherein computing the transfer function comprises: generating an error signal power;

computing an initial transfer function based on the amplitude response of the WSS; and iteratively generating an updated transfer function as a product of a previous transfer function and the inverse of the amplitude response of the WSS until the error signal power is minimized, wherein the previous transfer function in a first iteration is the initial transfer function, wherein the updated transfer function generated by one iteration is used as the previous transfer function in a next iteration, and wherein a transfer function that minimizes error signal power is designated as the transfer function of the FDEQ.

2. The apparatus of claim 1, further comprising a time-domain equalizer coupled to the FDEQ, wherein the processor is further configured to compute a fast Fourier transform (FFT) of a plurality of tap weights of the time-domain equalizer, compute a phase response based on the FFT, and update the FDEQ based on the phase response prior to filtering any of the digital samples.

3. The apparatus of claim 2, wherein W(f) represents the FFT, and wherein the (phase response comprises exp(j·arg($\sqrt{\det(W(f))}$))).

4. The apparatus of claim 2, wherein the phase response D(f) is computed by solving the equation $$FFT\begin{Bmatrix} w_{xx} & w_{yx} \\ w_{xy} & w_{yy} \end{Bmatrix} = D(f) \prod_{i=N,-1}^{1} U_i^{-1} V_i^{-1} \text{ for } D(f),$$

wherein $w_{xx}$, $w_{xy}$, $w_{yx}$, and $w_{yy}$ are the plurality of tap weights, wherein $U_i$ represents known polarization mode dispersion (PMD) matrices, wherein $V_i$ represents known polarization dependent loss (PDL) matrices, and wherein N represents a number of PMD and PDL components in the optical channel.

5. The apparatus of claim 3, wherein the initial transfer function is equal to $H_{RF}^{-1} \times H_{CD}^{-1} \times H_{WSS}^{-1}$, and wherein $H_{RF}$ represents a modem response, $H_{CD}$ represents chromatic dispersion, and $H_{WSS}$ represents the amplitude response of a WSS.

6. A method comprising: receiving a plurality of digital samples of a polarization multiplexed phase-shift-keying signal that has been transported over an optical channel; generating a frequency-domain equalizer (FDEQ) transfer function based at least in part on an amplitude response of a wavelength selective switch (WSS); and filtering at least one of the digital samples using the FDEQ transfer function to compensate for filtering effects of at least one WSS, wherein generating the FDEQ comprises: generating an error signal power; computing an initial transfer function based on the amplitude response of the WSS; and iteratively generating an updated transfer function as a product of a previous transfer function and the inverse of the amplitude response of the WSS until the error signal power is minimized.

7. The method of claim 6, wherein the previous transfer function in a first iteration is the initial transfer function, wherein the updated transfer function generated by one iteration is used as the previous transfer function in a next iteration, and wherein a transfer function that minimizes error signal power is designated as the FDEQ.

8. The method of claim 7, further comprising:
generating a plurality of tap weights of a time-domain equalizer based at least in part on the FDEQ, wherein the time-domain equalizer is coupled to the FDEQ;
computing a fast Fourier transform (FFT) of the plurality of tap weights of the time-domain equalizer;
computing a phase response based on the FFT; and
updating the FDEQ based on the phase response prior to filtering the digital samples.

9. The method of claim 8, wherein W(f) represents the FFT, and wherein the phase response comprises exp(j·arg($\sqrt{\det(W(f))}$))).

10. The method of claim 9, wherein the phase response D(f) is computed by solving the equation $$FFT\begin{Bmatrix} w_{xx} & w_{yx} \\ w_{xy} & w_{yy} \end{Bmatrix} = D(f) \prod_{i=N,-1}^{1} U_i^{-1} V_i^{-1} \text{ for } D(f),$$

wherein $w_{xx}$, $w_{xy}$, $w_{yx}$, and $w_{yy}$ are the plurality of time-domain equalizer tap weights, wherein $U_i$ represents known polarization mode dispersion (PMD) matrices, wherein $V_i$ represents known polarization dependent loss (PDL) matrices, and wherein N represents a number of PMD and PDL components in the optical channel.

11. The method of claim 9, wherein the initial transfer function is equal to $H_{RF}^{-1} \times H_{CD}^{-1} \times H_{WSS}^{-1}$, wherein $H_{RF}$ represents a modem response, wherein $H_{CD}$ represents chromatic dispersion, and wherein $H_{WSS}$ represents the amplitude response of a WSS.

12. An apparatus comprising: a plurality of frequency-domain equalizers (FDEQs) configured to receive digital samples of a polarization multiplexed (PM) phase-shift-keying signal that has been transported over an optical channel;
a time-domain equalizer (TDE) coupled to the FDEQs and configured to filter outputs from the FDEQs; a carrier phase recovery and correction unit coupled to the TDE and configured to correct a phase of outputs from the TDE;
a decision unit coupled to the carrier phase recovery and correction unit and configured to generate symbol decisions for the PM phase-shift-keying signal; and
an FDEQ updating unit configured to
receive an error signal power generated as a difference between an input to the decision unit and an output from the decision unit and to iteratively generate a transfer function of the FDEQs, based at least in part on the error signal power and an amplitude response of a wavelength selective switch (WSS), to compensate for filtering effects of at least one WSS; and
compute an initial transfer function based on the amplitude response of the WSS,
wherein iteratively generating a transfer function further comprises iteratively generating an updated transfer function as a product of a previous transfer function and the inverse of the amplitude response of the WSS until the error signal power is minimized.

13. The apparatus of claim 12, wherein the previous transfer function in a first iteration is the initial transfer function, wherein the updated transfer function generated by one iteration is used as the previous transfer function in the next iteration, and wherein a transfer function that minimizes error signal power is designated as the transfer function for the FDEQs.

14. The apparatus of claim 13, wherein the FDEQ updating unit is further configured to compute a fast Fourier transform (FFT) of a plurality of tap weights of a time-domain equalizer, compute a phase response based on the FFT, and update the FDEQ based on the phase response prior to filtering the digital samples.

15. The apparatus of claim 14, wherein W(f) represents the FFT, and wherein the phase response comprises $\exp(j \cdot \arg(\sqrt{\det(W(f))}))$.

16. The apparatus of claim 14, wherein the phase response D(f) is computed by solving the equation $$FFT\left\{\begin{matrix} w_{xx} & w_{yx} \\ w_{xy} & w_{yy} \end{matrix}\right\} = D(f) \prod_{i=N,-1}^{1} U_i^{-1} V_i^{-1} \text{ for } D(f),$$

wherein $w_{xx}$, $w_{xy}$, $w_{yx}$, and $w_{yy}$ are time-domain equalizer tap weights, wherein $U_i$ represents known polarization mode dispersion (PMD) matrices, wherein $V_i$ represents known polarization dependent loss (PDL) matrices, and wherein N represents a number of PMD and PDL components in the optical channel.

17. The apparatus of claim 16, further comprising an integrated coherent receiver configured to receive a PM phase-shift-keying optical signal input and generate at least one output electrical signal, and at least one analog-to-digital converter (ADC) coupled to the integrated coherent receiver and configured to generate digital samples of the at least one output electrical signal and provide the digital samples to the FDEQ.

18. The apparatus of claim 15, wherein the initial transfer function is equal to $H_{RF}^{-1} \times H_{CD}^{-1} \times H_{WSS}^{-1}$, and wherein $H_{RF}$ represents a modem response, $H_{CD}$ represents chromatic dispersion, and $H_{WSS}$ represents the amplitude response of the WSS.

19. The apparatus of claim 18, further comprising an integrated coherent receiver configured to receive a PM phase-shift-keying optical signal input and generate at least one output electrical signal, and at least one analog-to-digital converter (ADC) coupled to the integrated coherent receiver and configured to generate digital samples of the at least one output electrical signal and provide the digital samples to the FDEQ.

* * * * *

UNITED STATES PATENT AND TRADEMARK OFFICE
CERTIFICATE OF CORRECTION

PATENT NO. : 8,837,957 B2  Page 1 of 1
APPLICATION NO. : 13/348952
DATED : September 16, 2014
INVENTOR(S) : Zhuhong Zhang et al.

It is certified that error appears in the above-identified patent and that said Letters Patent is hereby corrected as shown below:

In the Claims:

Column 9, Line 64, Claim 3:
Delete "the (phase response comprises" and insert -- the phase response comprises --

Column 10, Line 49, Claim 10:
Delete "The method of claim 9," and insert -- The method of claim 8, --

Column 11, Lines 1-27, Claim 12, should read as:
-- 12. An apparatus comprising: a plurality of frequency-domain equalizers (FDEQs) configured to receive digital samples of a polarization multiplexed (PM) phase-shift-keying signal that has been transported over an optical channel;
  a time-domain equalizer (TDE) coupled to the FDEQs and configured to filter outputs from the FDEQs; a carrier phase recovery and correction unit coupled to the TDE and configured to correct a phase of outputs from the TDE;
  a decision unit coupled to the carrier phase recovery and correction unit and configured to generate symbol decisions for the PM phase-shift-keying signal; and
    an FDEQ updating unit configured to:
      receive an error signal power generated as a difference between an input to the decision unit and an output from the decision unit and to iteratively generate a transfer function of the FDEQs, based at least in part on the error signal power and an amplitude response of a wavelength selective switch (WSS), to compensate for filtering effects of at least one WSS; and
      compute an initial transfer function based on the amplitude response of the WSS,
    wherein iteratively generating a transfer function further comprises iteratively generating an updated transfer function as a product of a previous transfer function and the inverse of the amplitude response of the WSS until the error signal power is minimized. --

Signed and Sealed this
Sixteenth Day of December, 2014

Michelle K. Lee
*Deputy Director of the United States Patent and Trademark Office*